(12) United States Patent
Karuppaswamy et al.

(10) Patent No.: US 9,949,535 B2
(45) Date of Patent: Apr. 24, 2018

(54) SEAT BELT BUCKLE EXTENDER

(71) Applicant: GM Global Technology Operations LLC, Detroit, MI (US)

(72) Inventors: Senthil N. Karuppaswamy, Rochester Hills, MI (US); Matthew W. Derkach, Oak Park, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/082,008

(22) Filed: Mar. 28, 2016

(65) Prior Publication Data

US 2017/0273412 A1 Sep. 28, 2017

(51) Int. Cl.
*A44B 11/25* (2006.01)
*B60R 22/30* (2006.01)

(52) U.S. Cl.
CPC ...... *A44B 11/2546* (2013.01); *A44B 11/2561* (2013.01); *A44B 11/2569* (2013.01); *B60R 22/30* (2013.01)

(58) Field of Classification Search
CPC ............ A44B 11/2546; A44B 11/2561; A44B 11/2523; A44B 11/2542; A44B 11/258; A44B 11/2576; B60R 22/30
See application file for complete search history.

(56) References Cited

U.S. PATENT DOCUMENTS

| 5,098,162 | A | * | 3/1992 | Forget | B60R 22/22 297/482 |
|---|---|---|---|---|---|
| 5,634,664 | A | * | 6/1997 | Seki | A44B 11/2557 280/806 |
| 6,969,122 | B2 | * | 11/2005 | Sachs | B60R 22/30 280/801.1 |
| 2010/0314930 | A1 | * | 12/2010 | Akaike | A44B 11/2523 297/468 |
| 2013/0263411 | A1 | * | 10/2013 | Jagodzinski | B60R 22/48 24/633 |
| 2015/0296928 | A1 | * | 10/2015 | Krauss | A44B 11/2546 362/549 |
| 2016/0129877 | A1 | * | 5/2016 | Spahn | A44B 11/2592 24/593.1 |
| 2016/0135548 | A1 | * | 5/2016 | Kawai | A44B 11/2546 297/474 |

* cited by examiner

*Primary Examiner* — Robert Sandy
*Assistant Examiner* — Rowland Do
(74) *Attorney, Agent, or Firm* — Lorenz & Kopf, LLP

(57) ABSTRACT

A latch plate is selectively latched to, and selectively unlatched from, a buckle. An extender is moved by the latch plate to a retracted position when the latch plate is latched to the buckle and moves to an extended position when the latch plate is unlatched from the buckle.

18 Claims, 3 Drawing Sheets

SEAT BELT BUCKLE EXTENDER

TECHNICAL FIELD

The field to which the disclosure generally relates includes buckles, and more particularly, includes buckles for vehicle seat belts.

BACKGROUND

Buckles may be used in a variety of applications to connect two members in a selectively releasable manner. One application may involve seat belts. Seat belts may be used in combination with a seat to extend over a passenger in a seated position. A buckle may be used to selectively latch and unlatch the seat belt. Seat belts may include a belt that may be made of a webbing material, and that may be anchored at two points. A member for connecting with the buckle may be connected to the webbing between the two anchor points. The seat belt may be fastened over the passenger by connecting the member to the buckle, which may be anchored at a third point. The arrangement may be referred to as a three-point seat belt system. Seat belts may be provided in other arrangements such as two, four, five and six point systems.

SUMMARY OF ILLUSTRATIVE VARIATIONS

A number of illustrative variations may involve a product that may include a buckle. A latch plate may be selectively latched to, and selectively unlatched from, the buckle. An extender may be moved by the latch plate to a retracted position when the latch plate is latched to the buckle and may automatically move to an extended position when the latch plate is unlatched from the buckle.

A number of additional variations may involve a product that may include a latch plate that may have a tongue. A buckle may have a striker that may engage the tongue to latch the latch plate to the buckle and to unlatch the latch plate from the buckle by disengaging from the tongue. An extender may be presented at an extended position. In a retracted position, the extender may extend away from the buckle a first distance when the tongue may be disengaged from the striker. The extender may extend from the buckle a second distance that may be smaller than the first distance when the tongue may be engaged with the striker.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
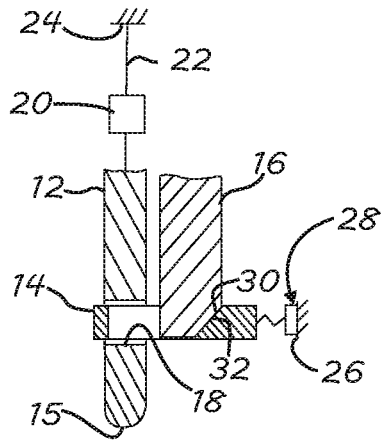
FIG. 1 is a schematic fragmentary illustration of part of a product according to a number of variations.

In a number of variations as illustrated in schematic form in FIG. 1, a buckle and latch plate may be connected through a latching structure that may generally include a tongue 12, a striker 14, and a release button 16. The tongue 12 may be a flat, relatively thin structure that may include an opening 18 to form a catch, and that may have a tip 15 at its terminal end. The tongue 12 may be a part of a latch or a plate assembly 20 that may be connected by a link, such as a belt 22 to a structure 24. The striker 14 may be connected to a structure 26, which may be a part of a common larger structure with the structure 24. In a number of variations the structures 24, 26 may be separate objects that may be retained together through the striker 14 and tongue 12. The striker 14 may be part of a buckle or a buckle assembly 28 that may be connected to the structure 26. To connect the latch plate assembly 20 with the buckle assembly 28, the striker 14 may extend through the opening 28 to catch the tongue 12 providing a latched condition as shown in FIG. 1. The striker 14 may be biased toward the tongue 12 to automatically enter the opening 28 when aligned therewith.

Figure 2:
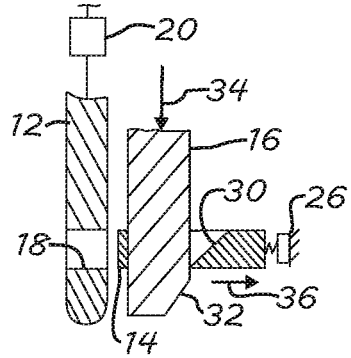
FIG. 2 is a schematic fragmentary illustration of part of a product according to a number of variations.

In a number of variations the striker 14 and the release button 16 may cooperate through mating cam elements 30, 32 respectively. The cam elements 30, 32 may take a variety of forms and may include levers, ramps, contoured surfaces, or other interfaces to convert translation of the release button 16 to lateral translation of the striker 14 to move it out of the opening 18. With reference to FIG. 2, a force 34 on the release button 16 may cause translation of the release button in the direction of the applied force 34. The cam elements 30, 32 may interact to effect translation of the striker 14 in a direction 36 that may be lateral relative to the direction of the force 34 or may be approximately at ninety degrees relative thereto. As a result, the striker 14 may be retracted from the opening 18 releasing the tongue 12 providing the unlatched condition of FIG. 2, so that the latch plate assembly 20 and the belt 22 may be move away from the buckle assembly 28. Such may be the case when an occupant desires to exit a seat associated with the belt 22.

Figure 3:
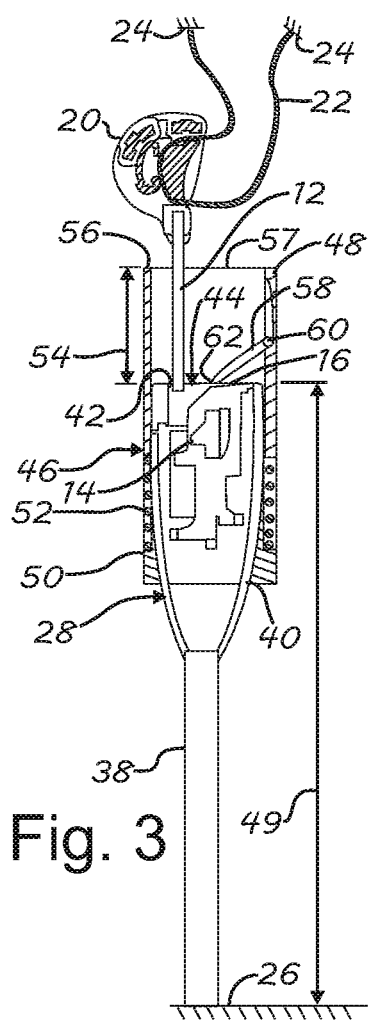
FIG. 3 is a fragmentary illustration of part of a product according to a number of variations.
Figure 4:
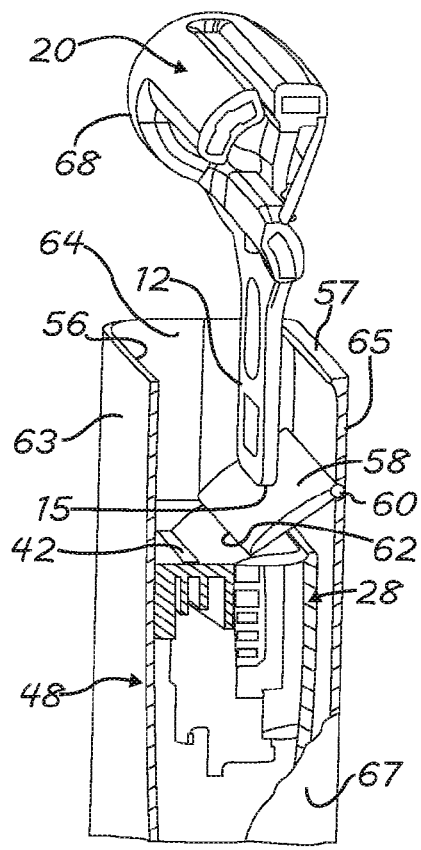
FIG. 4 is a fragmentary illustration of part of a product according to a number of variations.

In a number of variations as illustrated in FIG. 3, the buckle assembly 28 may be anchored to the structure 26 through a link 38 that may be a rigid or flexible member and may position the buckle assembly 28 at a desirable position relative to a seat (shown in FIG. 7), and/or a desirable height 49 relative to the structure 26. In a number of variations the structure 26 may be the seat. The release button 16 and the striker 14 may be positioned in a housing 40 that may define an opening 42 through the buckle face 44 into which the tongue 12 may be inserted and directed toward engagement with the striker 14. A receiver assembly 46 may be associated with the housing 40, at least part of which may be mounted thereon in an extendable fashion. The receiver assembly 46 may include an extender 48 that may slide over the housing 40. A base 50 may be attached to, or formed with the housing 40. A spring element 52 may be compressed between the extender 48 and the base 50 to automatically move the extender 48—when free of interaction with the latch plate assembly 20—beyond the buckle face 44 a distance 54. The buckle face 44 may be located at the height 49 from the structure 26. The extender 48 may present an opening 56 at height equal to the height 49 plus the extended distance 54, to present a receptacle face 57 for the tongue 12 of the latch plate assembly 20 at a convenient location that may be higher than the buckle face 44 and that may be more easily found than the opening 42. For example, if the buckle assembly 28 is located near or between other structures (such as of the associated seat), the extender 48 may present away from those structures by extending the distance 54. The distance 54 may be selected to provide such a readily accessed presentation.

Figure 5:
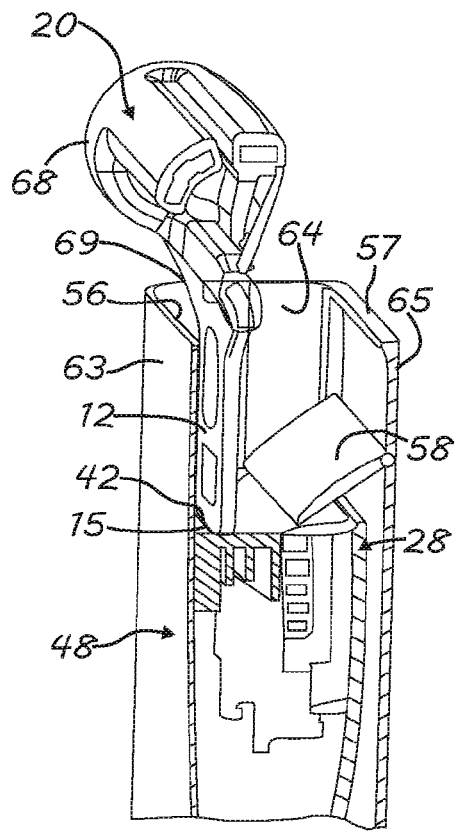
FIG. 5 is a fragmentary illustration of part of a product according to a number of variations.

With additional reference to FIGS. 4-7, the extender 48 may include four side walls, including walls 63-65, and a fourth wall 67 shown broken away for visibility of the buckle assembly 28. The four walls 63, 64, 65, 67 may define the opening 56 and may define a four sided structure shaped to slide over the buckle assembly 28. The latch plate assembly 20, shown without the connected webbing, may be inserted into the extender 48, when it is in the extended position shown in FIG. 4, through the opening 56 in the receptacle face 57. The tongue 12 may enter anywhere within the opening 56 and may be guided by the walls 63, 64, 65 and 67. In a number of variations, the extender 48 may be associated with a guide 58, if desired, that may swing and that may be attached to the extender 48 at a pivot 60, which may be on the wall 65. The pivot 60 may be located on the wall 65 inside the receptacle face 57 a distance that is less than the distance 54. With the extender 48 in the extended position of FIG. 4, the guide 58 may be angled so that its end 62 may be further from the receptacle face 57 than the pivot 60. The guide 58 may extend over the release button 16 so as to form a funnel shape toward the opening 42. When the tongue 12 may be inserted through the opening 56, if it is misaligned with the opening 42 in the buckle face 44, the guide 58 may help guide and direct the tip 15 toward the opening 42. The guide 58 may extend substantially completely across the extender 48 from the wall 64 to the wall 67. The guide 58 may extend from the wall 65 approximately to the opening 42, when the extender 48 is in the extended position. The funnel shape provided by the guide 58, in combination with the walls 63, 64, 65, 67, helps the tip 15 slide toward the opening 42 as insertion pressure is applied. When the tip 15 is aligned with the opening 42 as shown in FIG. 5, entry of the tongue 12 into the opening 42 may occur.

Figure 6:
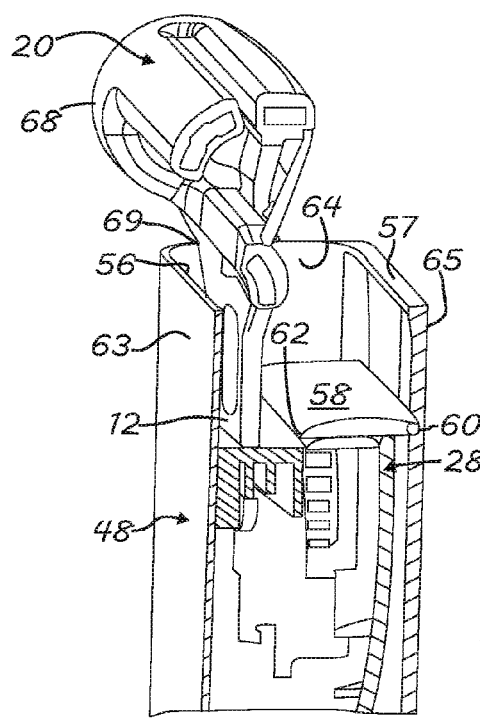
FIG. 6 is a fragmentary illustration of part of a product according to a number of variations.

In a number of variations, the latch plate assembly 20 may be sized and/or shaped so that once the tongue 12 is aligned with the opening 42 further insertion through the opening 42 initiates interference contact between the latch plate assembly 20 and the extender 48. For example, the head 68 may contact the extender 48 at the receptacle face 57 through a contact interface 69. In other variations, for example, the tongue 12 may contact an extension on the inside of the wall 63. The intended result being that continued insertion of the tongue 12, applies force to the extender 48 compressing the spring 52 and causing the extender 48 to slide (downward as viewed in FIGS. 4-7), over the buckle assembly 28. The direction the extender 48 slides, moves the receptacle face 57 toward the buckle face 44. As the tongue 12 may be further inserted through the opening 42 as shown in FIG. 6, a sliding movement of the extender 48 over the buckle assembly 28 causes the guide to rotate about the pivot 60. The end 62 may contact the buckle face 44 so that the end 62 moves toward the receptacle face 57 (upward in FIGS. 5 and 6). As the latch plate assembly 20 is moved to the latched position of FIG. 7, the extender 48 may have translated over the buckle assembly 28 so that the receptacle face 57 is approximately in line with the buckle face 44. In other words the extender 48 has moved to a retracted position of FIG. 7 to reveal the buckle face 44. The retracted position of the extender 48 may correspond with the latched position of the latch plate assembly 20. In the latched position, the button 16 is readily accessible for use in selective release of the latch plate assembly 20 from the buckle assembly 28. In the latched position of FIG. 7, the guide 58 may have pivoted so that it may be parallel with the wall 65, and may be contained in a recess 70 between the wall 65 and the buckle assembly 28. The recess 70 may be formed in the wall 65 as shown, or in the buckle assembly 28. The guide 58 may be oriented so that the end 62 may be tucked under, and adjacent the receptacle face 57. When the latch plate assembly 20 is unlatched form the buckle assembly 28, it may no longer interfere with the extender 28 and the spring 52 may move the extender 48 to the extended position of FIG. 4. The extended position of the extender 48 may correspond to the unlatched condition, with the latch plate assembly 20 removed from the extender 48.

Figure 7:
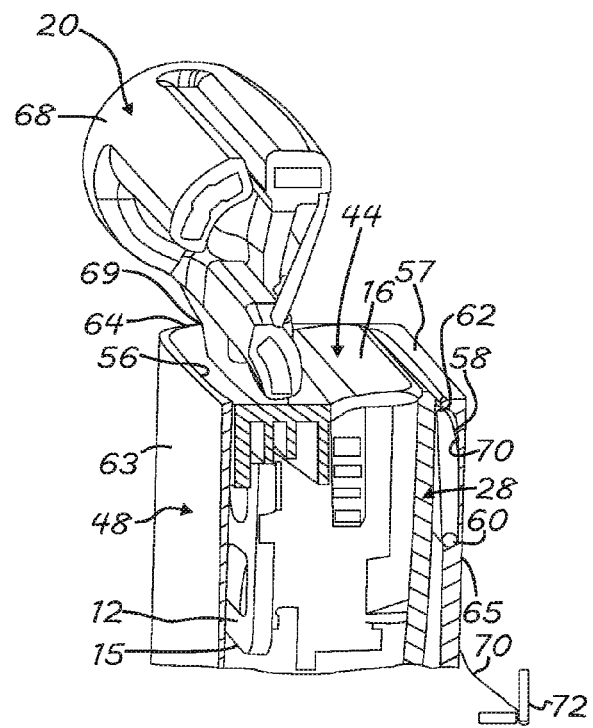
FIG. 7 is a fragmentary illustration of part of a product according to a number of variations.

In a number of other variations the product may include a tether 70, shown schematically in FIG. 7, for retracting the extender 48. One end of the tether 70 may be attached to the extender 48 and the other end may be attached to an associated seat back 72 structure. When the seat back 72 may be folded, the tether 70 will be pulled to retract the extender 48 automatically, enabling easy folding of the seat back 72 with the extender 48 retracted to the position of FIG. 7. In this variation, the extender 48 may be retracted without a latch plate 12 engaging the striker 14.

Through the variations described herein, a product is provided that may present a convenient entry point for a latch plate assembly 20 in locating and latching with a buckle assembly 28. The product may include an extender 48 that extends when the latch assembly 20 is removed from the buckle assembly 28, and stands ready presenting itself for receiving the tongue 12 of the latch plate assembly 20. When the latch plate assembly 20 is engaged with the buckle assembly 28 in a latched condition, the height of the latch point may be reduced to the buckle face 44 height by translation of the extender 48. A contact interface 69 may provide the sole mechanism to move the extender from the extended position to the retracted position under the insertion force applied to the latch plate assembly 20. The following description of variants is only illustrative of components, elements, acts, product and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may involve a product that may include a buckle. A latch plate may be selectively latched to, and selectively unlatched from, the buckle. An extender may be moved by the latch plate to a retracted position when the latch plate is latched to the buckle and may move to an extended position when the latch plate is unlatched from the buckle.

Variation 2 may include the product according to variation 1 wherein the buckle may include a buckle face. The extender may include a receptacle face that may define an extender opening. The receptacle face may be presented at a distance in front of the buckle face when the latch plate may be unlatched from the buckle.

Variation 3 may include the product according to variation 2 wherein the buckle face may be positioned at a height. The extender face may be substantially aligned at the height with the buckle face when the latch plate is latched to the buckle.

Variation 4 may include the product according to variation 1 wherein the latch plate may contact the extender at a contact interface when the latch plate may be latched to the buckle. The contact interface may provide a sole mechanism to move the extender from the extended position to the retracted position under an insertion force applied to the latch plate.

Variation 5 may include the product according to variation 1 wherein the extender may have four walls, each of which may extend over the buckle.

Variation 6 may include the product or variation 5 and may include a base on the buckle. A spring may extend between the base and the extender to automatically move the extender to the extended position when the latch plate may be unlatched form the buckle, and removed from the extender.

Variation 7 may include the product according to variation 1 wherein the latch plate may include a tongue. The buckle may include a buckle face that may define a buckle opening into which the tongue may be inserted when the latch plate may be latched to the buckle. The buckle face may be positioned at a first height. The extender may include a receptacle face that may define an extender opening that may be presented at a second height. The second height may be higher than the first height when the latch plate may be unlatched from the buckle and removed therefrom.

Variation 8 may include the product according to variation 7 wherein the receptacle face may be positioned at the first height when the latch plate may be latched to the buckle.

Variation 9 may include the product according to variation 1 comprising a guide connected to the extender at a pivot, the guide swinging when the extender is moved from the extended position to the retracted position.

Variation 10 may include the product according to variation 9 wherein the extender may define a recess into which the guide may be positioned when the extender may be in the retracted position.

Variation 11 may include the product according to variation 9 wherein the guide may be angled relative to the extender, and may extend from the pivot to the buckle, when the extender may be in the extended position.

Variation 12 may involve a product that may include a latch plate that may have a tongue. A buckle may have a striker that may engage the tongue to latch the latch plate to the buckle and to unlatch the latch plate from the buckle by disengaging from the tongue. An extender may be presented at an extended position. In a retracted position, the extender may extend away from the buckle a first distance when the tongue may be disengaged from the striker. The extender may extend from the buckle a second distance that may be smaller than the first distance when the tongue may be engaged with the striker.

Variation 13 may include the product according to variation 12 wherein the second distance may be substantially zero so that the extender may be aligned with the buckle.

Variation 14 may include the product according to variation 12 wherein the buckle may include a buckle face and the extender may include a receptacle face that may define an extender opening. The receptacle face may be presented at the first distance in front of the buckle face when the tongue may be unlatched from the striker.

Variation 15 may include the product according to variation 14 wherein the extender face may be substantially aligned with the buckle face when the tongue may be latched to the striker.

Variation 16 may include the product according to variation 12 wherein the latch plate may contact the extender at a contact interface when the tongue may be latched to the striker. The contact interface may provide a sole mechanism to move the extender from the extended position to the retracted position under an insertion force that may be applied to the latch plate.

Variation 17 may include the product according to variation 12 and may include a base on the buckle. A spring may extend between the base and the extender to automatically move the extender to the extended position when the tongue may be unlatched form the striker and removed from the extender.

Variation 18 may include the product according to variation 12 and may include a guide that may be connected to the extender at a pivot. The guide may swing when the extender may be moved from the extended position to the retracted position.

Variation 19 may include the product according to variation 18 wherein the extender may define a recess into which the guide may be positioned when the extender is in the retracted position.

Variation 20 may include the product according to variation 12 and may include a structure wherein the buckle may be anchored to the structure. A belt may be connected to the latch plate. The belt may be anchored to the structure. The buckle may be positioned away from the structure at a height and the extender may be positioned away from the structure at the height plus the first distance, when in the extended position.

The above description of select variations within the scope of the invention is merely illustrative in nature and, thus, variations or variants thereof are not to be regarded as a departure from the spirit and scope of the invention.

What is claimed is:

1. A product comprising a buckle, a latch plate selectively latched to, and selectively unlatched from, the buckle, and an extender that surrounds the buckle and has a wall slidable over the buckle, wherein the extender is movable by the latch plate to a retracted position when the latch plate is latched to the buckle and the extender automatically moves to an extended position when the latch plate is unlatched from the buckle, and comprising a guide configured to guide the latch plate into the buckle, the guide connected to the wall by a pivot, wherein when the extender is in the extended position, the guide extends from the wall and over the buckle, and when the extender is in the retracted position, the guide is disposed parallel with the wall and is contained between the wall and the buckle, wherein the buckle includes a buckle face and the extender includes a receptacle face that defines an extender opening, wherein the receptacle face is presented at a distance in front of the buckle face when the latch plate is unlatched from the buckle, wherein the guide includes an end opposite the pivot that extends across the buckle face, and when the extender is in the extended position, the end contacts the buckle face so that the guide is pivoted by the buckle when the extender is moved from the extended position to the retracted position, wherein the buckle face is positioned at a height relative to the wall, and the extender face is substantially aligned at the height with the buckle face when the latch plate is latched to the buckle wherein the guide is contained below the height when the extender is in the retracted position.

2. The product according to claim 1 wherein the latch plate contacts the extender at a contact interface when the latch plate is latched to the buckle and wherein the contact interface provides a sole mechanism to move the extender from the extended position to the retracted position under an insertion force applied to the latch plate.

3. The product according to claim 1 comprising a release button in the buckle, the release button configured to unlatch the latch plate from the buckle, wherein the guide extends over the release button when the extender is in the extended position and wherein the guide does not extend over the release button when the extender is in the retracted position so that the release button is accessible to unlatch the latch plate when the latch plate is latched to the buckle.

4. The product according to claim 3 comprising a base on the buckle and a spring extending between the base and the extender to automatically move the extender to the extended position when the latch plate is unlatched form the buckle and removed from the extender.

5. The product according to claim 1 wherein the latch plate includes a tongue and the buckle face defines a buckle opening into which the tongue is inserted when the latch plate is latched to the buckle, wherein the buckle face is positioned at the height when the latch plate is latched to the buckle, and the extender opening is presented at a second height that is higher than the height when the latch plate is unlatched from the buckle and removed therefrom, wherein a release button is disposed flush with the buckle face and is configured to unlatch the latch plate from the buckle wherein the release button is exposed through the receptacle face when the extender is in the retracted position and is concealed by the guide when the extender is in the extended position.

6. The product according to claim 5 wherein the receptacle face is positioned at the height when the latch plate is latched to the buckle and comprising a striker that engages the tongue to latch the latch plate to the buckle and mating cam elements through which the release button is engaged with the striker.

7. The product according to claim 1 wherein the latch plate is receivable through the receptacle face, wherein the pivot is spaced away from the receptacle face and the guide extends from the pivot to an end, wherein when the extender is in the retracted position, the guide is oriented so that the end is tucked under, and disposed adjacent the receptacle face.

8. The product according to claim 7 wherein the guide is angled relative to the extender and extends from the pivot to the buckle when the extender is in the extended position, wherein the wall defines a recess, wherein the guide, in its entirety, is contained in the recess when the extender is in the retracted position.

9. A product comprising a buckle, a latch plate selectively latched to, and selectively unlatched from, the buckle, and an extender that surrounds the buckle and has a wall slidable over the buckle, wherein the extender is movable by the latch plate to a retracted position when the latch plate is latched to the buckle and the extender automatically moves to an extended position when the latch plate is unlatched from the buckle, and comprising a guide configured to guide the latch plate into the buckle, the guide connected to the wall by a pivot, wherein when the extender is in the extended position, the guide extends from the wall and over the buckle, and when the extender is in the retracted position, the guide is disposed parallel with the wall and is contained between the wall and the buckle, wherein the extender defines a receptacle face through which the latch plate is receivable, wherein the pivot is spaced away from the receptacle face and the guide extends from the pivot to an end, wherein when the extender is in the retracted position, the guide is oriented so that the end is tucked under, and disposed adjacent the receptacle face, wherein the wall defines a recess and the guide is forced into the recess by the buckle when the extender is moved from the extended position to the retracted position so that the guide is contained in the recess and does not extend across the receptacle face when the extender is in the retracted position.

10. A product comprising a latch plate that has a tongue, a buckle that has a buckle face with a first opening through which the tongue is received and a striker wherein the striker engages the tongue to latch the latch plate to the buckle and to unlatch the latch plate from the buckle by disengaging from the tongue, an extender that has four walls that extend over the buckle, that terminate at a receptacle face and that define a second opening configured to receive the tongue, wherein the four walls include a first wall that defines a recess wherein the extender is presentable at an extended position, and a guide is connected to the first wall by a pivot to guide the tongue toward the first opening when inserted into the second opening, the pivot located adjacent the recess, wherein in a retracted position, the extender extends away from the buckle a first distance when the tongue is disengaged from the striker, with the guide extending across the second opening and the extender extends from the buckle a second distance that is smaller than the first distance when the tongue is engaged with the striker, where the guide is forced into the recess by the buckle so that the guide is contained in the recess and does not extend across the second opening.

11. The product according to claim 10 wherein the second distance is substantially zero so that the extender is aligned with the buckle and comprising a release button in the buckle adjacent the first opening, the release button configured to disengage the striker from the tongue, wherein the guide extends over the release button when the extender is in the extended position and wherein the guide does not extend over the release button when the extender is in the retracted position so that the release button is accessible when the tongue is engaged with the striker.

12. The product according to claim 10 wherein the buckle includes a buckle face and the extender includes a receptacle face that defines the second opening, wherein the receptacle face is presented at the first distance in front of the buckle face when the tongue is unlatched from the striker.

13. The product according to claim 12 wherein the extender face is substantially aligned with the buckle face when the tongue is latched to the striker, wherein a release button is disposed flush with the buckle face and adjacent the first opening and the release button is exposed through the second opening when the tongue is latched to the striker.

14. The product according to claim 10 wherein the latch plate contacts the extender at a contact interface when the tongue is latched to the striker and wherein the contact interface provides a sole mechanism to move the extender from the extended position to the retracted position under an insertion force applied to the latch plate.

15. The product according to claim 10 comprising a base on the buckle and a spring extending between the base and the extender to automatically move the extender to the extended position when the tongue is unlatched form the striker and removed from the extender.

16. The product according to claim 10 wherein the pivot is spaced away from the receptacle face and the guide extends from the pivot to an end, wherein when the extender is in the retracted position, the guide is oriented so that the end is tucked under, and disposed adjacent the receptacle face.

17. The product according to claim 16 wherein when the extender is in the retracted position, the guide is disposed parallel with the first wall and between the first wall and the buckle so that the guide is contained in the recess.

18. The product according to claim 10 comprising a structure wherein the buckle is anchored to the structure and comprising a belt connected to the latch plate, wherein the belt is anchored to the structure and wherein the buckle is positioned away from the structure at a height and the extender is positioned away from the structure at the height plus the first distance when in the extended position.

* * * * *

UNITED STATES PATENT AND TRADEMARK OFFICE
CERTIFICATE OF CORRECTION

PATENT NO. : 9,949,535 B2  
APPLICATION NO. : 15/082008  
DATED : April 24, 2018  
INVENTOR(S) : Karuppaswamy et al.

Page 1 of 1

It is certified that error appears in the above-identified patent and that said Letters Patent is hereby corrected as shown below:

In the Claims

Claim 15, Column 9, Line 1 "form" should be changed to --from--.

Signed and Sealed this
Sixteenth Day of October, 2018

Andrei Iancu
*Director of the United States Patent and Trademark Office*